(12) United States Patent
Choi

(10) Patent No.: US 8,687,089 B2
(45) Date of Patent: Apr. 1, 2014

(54) METHOD AND APPARATUS FOR MANAGING AN ALBUM

(75) Inventor: Jae-joon Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 12/959,537

(22) Filed: Dec. 3, 2010

(65) Prior Publication Data

US 2011/0134276 A1 Jun. 9, 2011

(30) Foreign Application Priority Data

Dec. 3, 2009 (KR) .......................... 10-2009-0119096

(51) Int. Cl.
H04N 5/76 (2006.01)
H04N 5/222 (2006.01)
G06F 3/048 (2013.01)

(52) U.S. Cl.
USPC .... 348/231.2; 715/769; 715/781; 348/333.05

(58) Field of Classification Search
None
See application file for complete search history.

(56) References Cited

U.S. PATENT DOCUMENTS

| 7,809,192 | B2* | 10/2010 | Gokturk et al. | 382/176 |
| 2008/0180408 | A1* | 7/2008 | Forstall et al. | 345/177 |
| 2009/0024914 | A1* | 1/2009 | Chen et al. | 715/230 |
| 2009/0093275 | A1* | 4/2009 | Oh et al. | 455/566 |
| 2009/0276710 | A1* | 11/2009 | Berkowitz et al. | 715/716 |
| 2010/0088617 | A1* | 4/2010 | Watanabe | 715/762 |
| 2010/0199166 | A1* | 8/2010 | Fisk, III | 715/230 |
| 2012/0127207 | A1* | 5/2012 | Matas et al. | 345/676 |

FOREIGN PATENT DOCUMENTS

| KR | 1020020055601 A | 7/2002 |
| KR | 1020050095066 A | 9/2005 |

* cited by examiner

Primary Examiner — Lin Ye
Assistant Examiner — John H Morehead, III
(74) Attorney, Agent, or Firm — Drinker Biddle & Reath LLP

(57) ABSTRACT

In a method and an apparatus for managing an album, when a user inputs a desired album title, texts of the desired album title are recognized and arranged, and a folder corresponding to the album title is automatically generated. Thus, convenience of the user is improved.

17 Claims, 6 Drawing Sheets

METHOD AND APPARATUS FOR MANAGING AN ALBUM

CROSS-REFERENCE TO RELATED PATENT APPLICATION

This application claims the priority benefit of Korean Patent Application No. 10-2009-0119096, filed on Dec. 3, 2009, in the Korean Intellectual Property Office, the disclosure of which is incorporated herein in its entirety by reference.

BACKGROUND

1. Field of the Invention

Embodiments relate to a photographing apparatus, and more particularly, to a method and an apparatus for managing albums in a photographing apparatus.

2. Description of the Related Art

The number of pictures that can be stored in a digital camera has increased with an increase in capacity of a memory card of the digital camera. In a general picture managing method, a user inputs letters for an album name, sees a corresponding picture, opens corresponding albums, sees pictures one by one, and respectively stores the pictures in the corresponding albums. Since the general picture managing method goes through several steps to manage pictures, handling of the general picture managing method is complicated, and a large amount of time is taken to handle the general picture managing method.

A sorting technique for arranging pictures according to photographing information including dates, days, persons, colors, and the like has been known. However, the sorting technique does not provide a user with convenience to intuitively put pictures into a desired album name.

SUMMARY

Embodiments include a method and an apparatus for recognizing and arranging texts corresponding to an album title input by a user and automatically generating a folder corresponding to the album title in order to improve convenience of the user.

Embodiments also include a computer-readable storage medium having stored thereon a computer program executable by a processor for performing the method.

According to an embodiment, a method for managing an album includes: displaying one or more pictures on a display screen; displaying an input window for inputting album names of the one or more pictures; recognizing texts which are input through the input window; and sorting the one or more pictures according to the recognized texts.

The method may further include generating one or more folders that correspond to the recognized texts and include the sorted pictures.

The method may further include displaying the one or more folders along with the displayed one or more pictures.

The one or more folders may be displayed on a bottom of the display screen.

The displayed one or more pictures may be dragged and dropped into the one or more folders.

The method may further including storing stored values corresponding to the recognized texts in an EXchangeable Image File (EXIF) of corresponding pictures, and generating albums according to the stored values.

The input window may be displayed on a bottom of the displayed one or more pictures.

The input window may be displayed to overlap with the displayed one or more pictures.

The one or more pictures may be displayed as thumbnail images.

The input window may be displayed in a center of the displayed thumbnail images.

According to another embodiment, an apparatus for managing an album includes: a display which displays one or more pictures on a display screen; a controller which controls the display to display an input window for inputting album names of the one or more pictures; a text recognizer which recognizes texts input through the input window; and an album manager which sorts and stores pictures according to the recognized texts.

The controller may generate one or more folders which correspond to the recognized texts and which include the sorted pictures, and the controller may store the one or more folders in the album manager.

The controller may control the display to display the one or more folders along with the displayed one or more pictures.

The controller may control the display to display the one or more folders on a bottom of the display screen.

The controller may drag and drop the displayed one or more pictures into the one or more folders.

The controller may store stored values corresponding to the recognized texts in an EXIF of corresponding pictures and generate albums according to the stored values.

The controller may control the display to display the input window on a bottom of the displayed one or more pictures.

The controller may control the display to display the input window so that the input window overlaps with the displayed one or more pictures.

According to another embodiment, a non-transitory computer-readable storage medium may have stored thereon a computer program executable by a processor for performing the method.

BRIEF DESCRIPTION OF THE DRAWINGS

The above and other features and advantages will become more apparent by describing in detail exemplary embodiments with reference to the attached drawings in which.

DETAILED DESCRIPTION

Exemplary embodiments will now be described more fully with reference to the accompanying drawings. In the description of the embodiments, if it is determined that a detailed description of commonly-used technologies or structures related to the embodiments may unnecessarily obscure the subject matter, the detailed description will be omitted.

Also, since later-described terms are defined in consideration of the functions of the embodiments, they may vary according to users' intentions or practice. Hence, the terms must be interpreted based on the contents of the entire specification.

Figure 1:
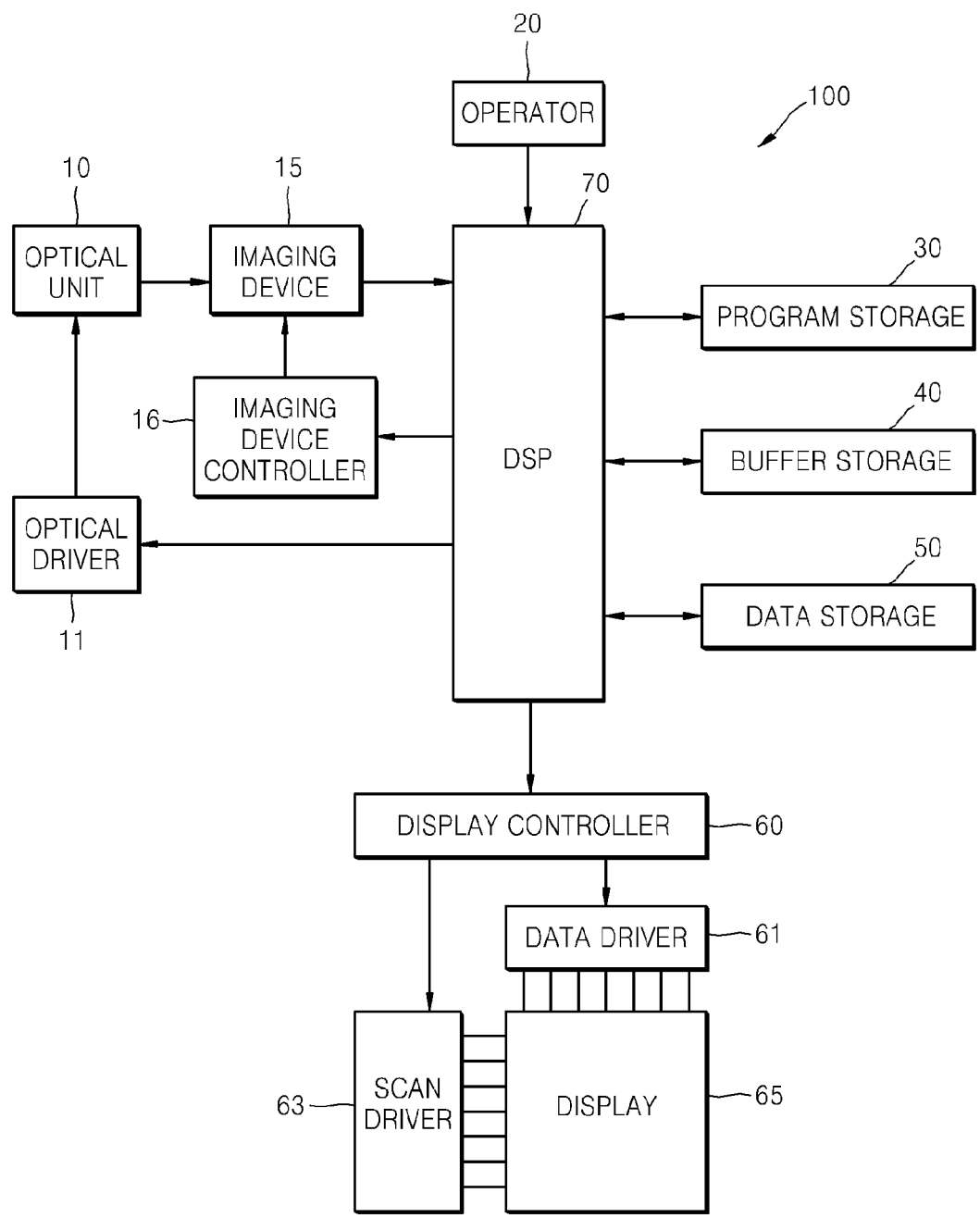
FIG. 1 is a schematic block diagram of a digital photographing apparatus 100, according to an embodiment.
Figure 2:
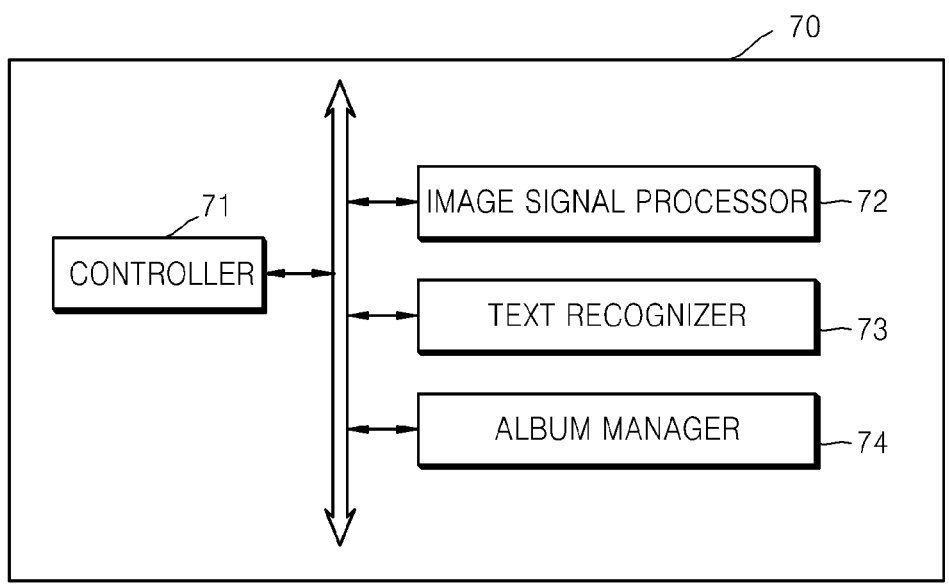
FIG. 2 is a schematic block diagram of a digital signal processor (DSP) 70 of the digital photographing apparatus 100 of FIG. 1, according to an embodiment.

FIG. 1 is a schematic block diagram of a digital photographing apparatus 100, according to an embodiment. FIG. 2 is a schematic block diagram of a digital signal processor (DSP) 70 of the digital photographing apparatus 100 of FIG. 1, according to an embodiment.

Referring to FIG. 1, the digital photographing apparatus 100 includes an optical unit 10, an optical driver 11, an imaging device 15, an imaging device controller 16, an operator 20, a program storage 30, a buffer storage 40, a data storage 50, a display controller 60, a data driver 61, a scan driver 63, a display 65, and the DSP 70.

The optical unit 10 receives an optical signal from a subject and transmits the optical signal to the imaging device 15. The optical unit 10 includes at least one of a zoom lens, a focus lens, and the like, wherein the zoom lens narrows or widens a view angle according to a focal length, and the focus lens adjusts a focus of the subject. The optical unit 10 also further includes an aperture which adjusts an amount of light.

The optical driver 11 adjusts a position of a lens, opening and/or closing of the aperture, and the like. The optical driver 11 moves the position of the lens to adjust the focus. The optical driver 11 adjusts opening and/or closing of the aperture to adjust the amount of light. The optical driver 11 controls the optical unit 10 according to a control signal which is automatically generated by an image signal input in real time or a control signal which is manually input by a user.

The optical signal that passes through the optical unit 10 forms an image of the subject on a light-receiving surface of the imaging device 15. The imaging device 15 may be a Charge Coupled Device (CCD) or a Complementary Metal Oxide Semiconductor Image Sensor (CIS) which converts the optical signal into an electrical signal. Sensitivity and the like of the imaging device 15 are adjusted by the imaging device controller 16. The imaging device controller 16 controls the imaging device 15 according to the control signal which is automatically generated by the image signal input in real time or the control signal which is manually input by the user.

The operator 20 receives the control signal from an external source such as the user or the like. The operator 20 includes a shutter-release button, a power button, a wide angle-zoom button, a telephoto-zoom button, and other various function buttons. The shutter-release button is pressed to input a shutter-release signal for exposing the imaging device 15 to light for a predetermined period of time and photographing a picture. The power button is pressed to supply power, and the wide angle-zoom button and the telephoto-zoom button are pressed to narrow or widen the view angle according to an input signal. The other various function buttons are pressed to select a letter input mode, a photographing mode, a replaying mode, a white balance setup function, a exposure setup function, and the like.

The digital photographing apparatus 100 further includes the program storage 30, the buffer storage 40, and the data storage 50. The program storage 30 stores programs of an operation system, an application system, and the like for operating the digital photographing apparatus 100. The buffer storage 40 temporarily stores data necessary when performing operations or data about the results of the operations. The data storage 50 stores an image file including the image signal and various types of information necessary for the programs.

The digital photographing apparatus 100 further includes the display controller 60, the data driver 61, the scan driver 63, and the display 65. The display controller 60 controls a display of an operation state of the digital photographing apparatus 100 or a display of information about an image captured by the digital photographing apparatus 100. The data driver 61 and the scan driver 63 receive display data from the display controller 60 and transmit the display data to the display 65. The display 65 displays a predetermined image according to the display data received from the data driver 61 and the scan driver 63. The display 65 may be a liquid crystal display (LCD) panel, an organic light-emitting display (OLED) panel, an electrophoretic display (EPD) panel, or the like.

According to an embodiment, the display 65 may be a single body into which a display screen and a touch panel are formed. Here, the touch panel senses touches using an optical sensor method, a resistive membrane method, an electric capacitance method, or a hybrid method. For example, an optical sensor type touch panel display device arranges optical sensors in pixels and enables inputs of information onto a screen using light. The optical sensors of the optical sensor type touch panel display device may be photodiodes, and capacitors may be connected to the photodiode of the pixels. The optical sensor type touch panel display device varies an amount of electric charge of the capacitors according to variations in an amount of received light of the photodiodes and detects voltages from both ends of each of the capacitors in order to generate data of a captured image. A touch screen display device in which an optical sensor is integrated into a panel detects an image of a finger projected onto a screen to input information. The touch screen display device detects light radiated from a luminous body such as a light pen or the like to input information. In more detail, the touch screen display device detects a touch position using external light or internal light that is emitted from the touch screen display device, e.g., light emitted from a photodiode.

The digital photographing apparatus 100 further includes the DSP 70 which processes the input image signal and controls the elements using the input image signal or an external input signal. The DSP 70 will now be described in more detail with reference to FIG. 2.

Referring to FIG. 2, the DSP 70 includes a controller 71, an image signal processor 72, a text recognizer 73, and an album manager 74. Here, it will be understood that the DSP 70 corresponds to an apparatus for managing an album, wherein the apparatus is defined in the claims.

The controller 71 controls an overall operation of the DSP 70.

The image signal processor 72 converts the image signal input from the imaging device 15 into a digital signal and performs image signal processing operations such as gamma correction, color filter array interpolation, color matrix, color correction, color enhancement, or the like in order to convert the image signal to a view point of a human. If an auto white balance function or an auto exposure function is set, the image signal processor 72 performs an auto white balance algorithm or an auto exposure algorithm. The image signal processor 72 adjusts a size of image data using a scalar and compresses the image data in order to form an image file having a predetermined format. The image signal processor 72 also decompresses the image file. The image signal processor 72 performs the above-mentioned image signal processing operations on an image signal that is input in real time in a live-view mode or an image signal that is input by the shutter-release signal, before picture-taking. Here, different types of image signal processing operations may be respectively performed on the image signals. According to an embodiment, the image signal processor 72 may downsample captured image data to generate thumbnail images.

The thumbnail images may be stored in a memory according to capture order or an arrangement method of a user.

Pictures that have been processed by the image signal processor 72 and stored in a memory or a recording medium are displayed on the display 65 under control of the controller 71. Here, the pictures are displayed on the display 65 one by one or are reduced to thumbnail sizes and displayed on the display 65 several sheets by several sheets. The controller 71 displays the pictures and an input window onto which album names of the pictures are input. The input window may be positioned at a bottom of a picture or may be positioned in the center of the picture to overlap with the picture if the picture has a thumbnail size.

The text recognizer 73 recognizes texts that are input through an input window for inputting an album name of a picture displayed on a display screen. Here, the texts are letters, figures, or combinations of the letters and the figures. If the texts are not input, the album name is set to be unknown. The controller 71 generates a folder corresponding to the texts recognized by the text recognizer 73 and stores the folder in the album manager 74. The controller 71 stores a stored value corresponding to the input texts in an EXchangeable Image File (EXIF) of a corresponding picture and generates an album, i.e., a folder including the corresponding picture, according to the stored value. Here, an album tile, an album name, and a folder will be used in the same meaning.

The album manager 74 sorts and stores pictures according to the recognized texts. A data table of each of the pictures stored in the album manager 74 includes other types of picture information including recording identification (ID), a path number, a file number, a date, time, a day, Global Positioning System (GPS) information, and the like, and an album title. Here, the album manager 74 arranges the pictures according to information that is input as texts through an input window for inputting an album name by a user, i.e., album names. The album manager 74 is separately included in the DSP 70 in the present embodiment, but the data storage 50 of FIG. 1 may perform the same function as the album manager 74.

The controller 71 controls the display 65 to display the generated folder along with the picture displayed on the display screen. In other words, the controller 71 controls the display 65 to arrange currently generated folders according to name order of the currently generated folders and display the currently generated folders at a bottom of the display screen. Accordingly, album names or folders including corresponding pictures are generated through inputs of texts and displayed at the bottom of the display screen. The controller 71 drags and drops pictures selected by a user into a corresponding folder. Here, the drag-and-drop method is generally used in computer environments in which a mouse icon is positioned in an object, a left button is pressed to drag a mouse to a desired position of a screen, and the left button is unpressed to move the object. If the drag-and-drop method is applied to a touch screen, a drag-and-drop operation may be performed by a movement of a finger of a user or a movement of a pen. Therefore, the user generates a first album name through a text input window and moves corresponding pictures into folders representing album names displayed at a bottom of a screen using a simple manipulation such as a drag-and-drop operation.

Figure 3:
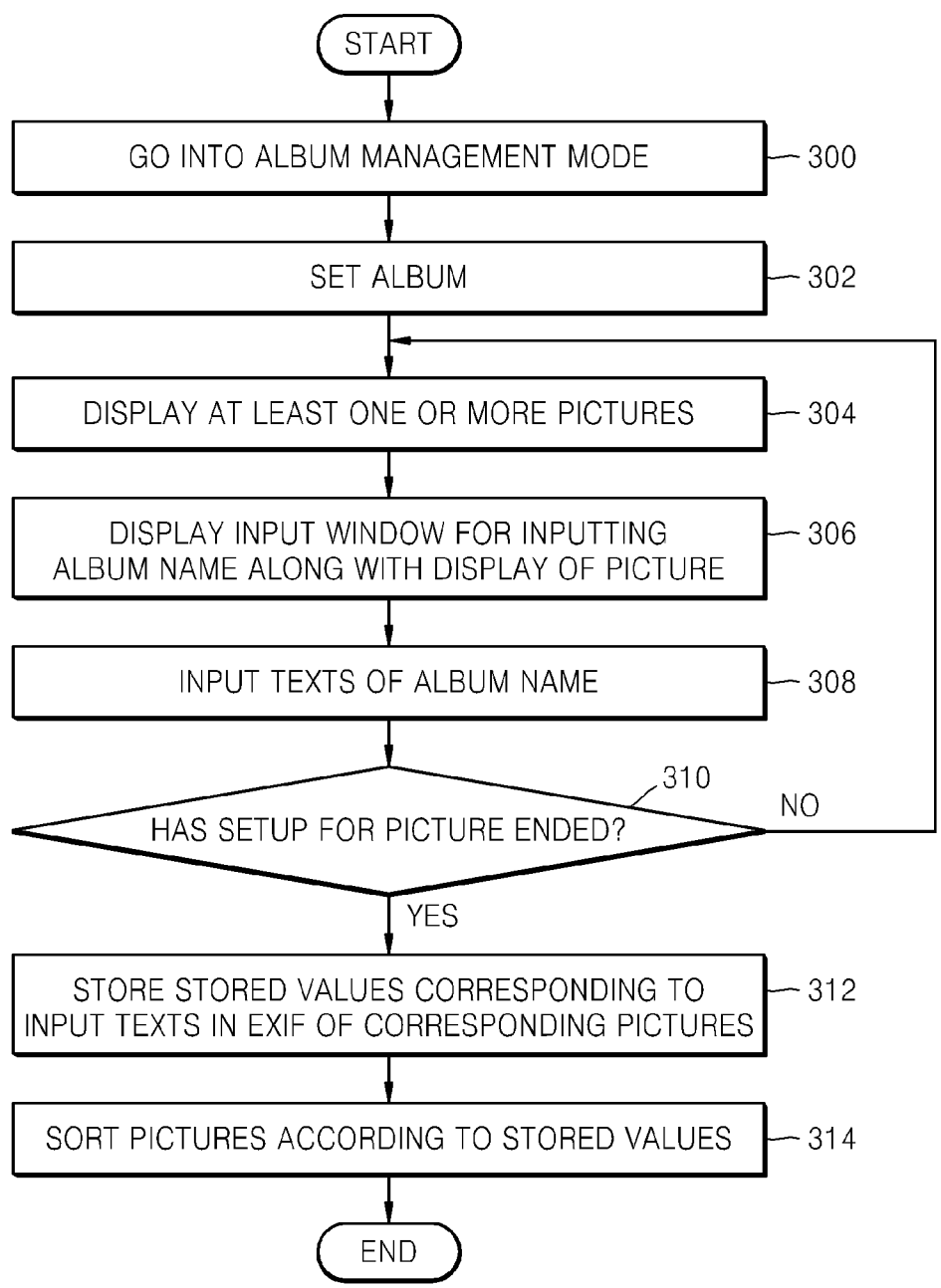
FIG. 3 is a flow chart of a method of managing an album, according to an embodiment.
Figure 4:
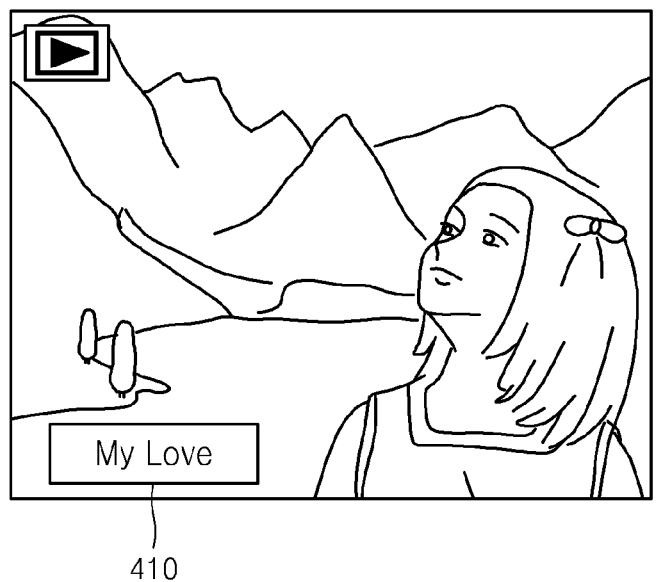
FIG. 4 illustrates an input window through which an album name is input along with a displayed picture, according to an embodiment.

FIG. 3 is a flow chart of a method of managing an album, according to an embodiment. FIG. 4 illustrates an input window through which an album name is input along with a displayed picture, according to an embodiment. Referring to FIG. 3, in operation 300, the process goes into an album management mode. Here, the album management mode refers to a mode in which captured pictures are managed in an album or a folder. In operation 302, an album setup is selected. In operation 304, one or more pictures are displayed. Here, the displayed pictures depend on a size of a display screen, i.e., are displayed one by one, several ones by several ones, or to thumbnail sizes. In operation 306, an input window for inputting an album name is popped up along with the display of the pictures. In other words, if a user selects a picture to which the user desires to give an album name, an input window for inputting an album name of the picture is displayed. Referring to FIG. 4, a specific picture is displayed on a screen, and an input window 410 for inputting an album name is displayed at a bottom of the screen. In operation 308, the user inputs album name texts, e.g., texts "My Love." Here, an input unit may be a touch screen, a separate key pad screen, or a key pad of a digital photographing apparatus.

In operation 310, a determination is made as to whether setup for the pictures has ended. If it is determined that the setup has ended, the process goes to operation 312 to store stored values corresponding to the input texts in an EXIF of the corresponding pictures. In operation 314, the pictures are sorted according to the stored values stored in operation 312.

Figure 5:
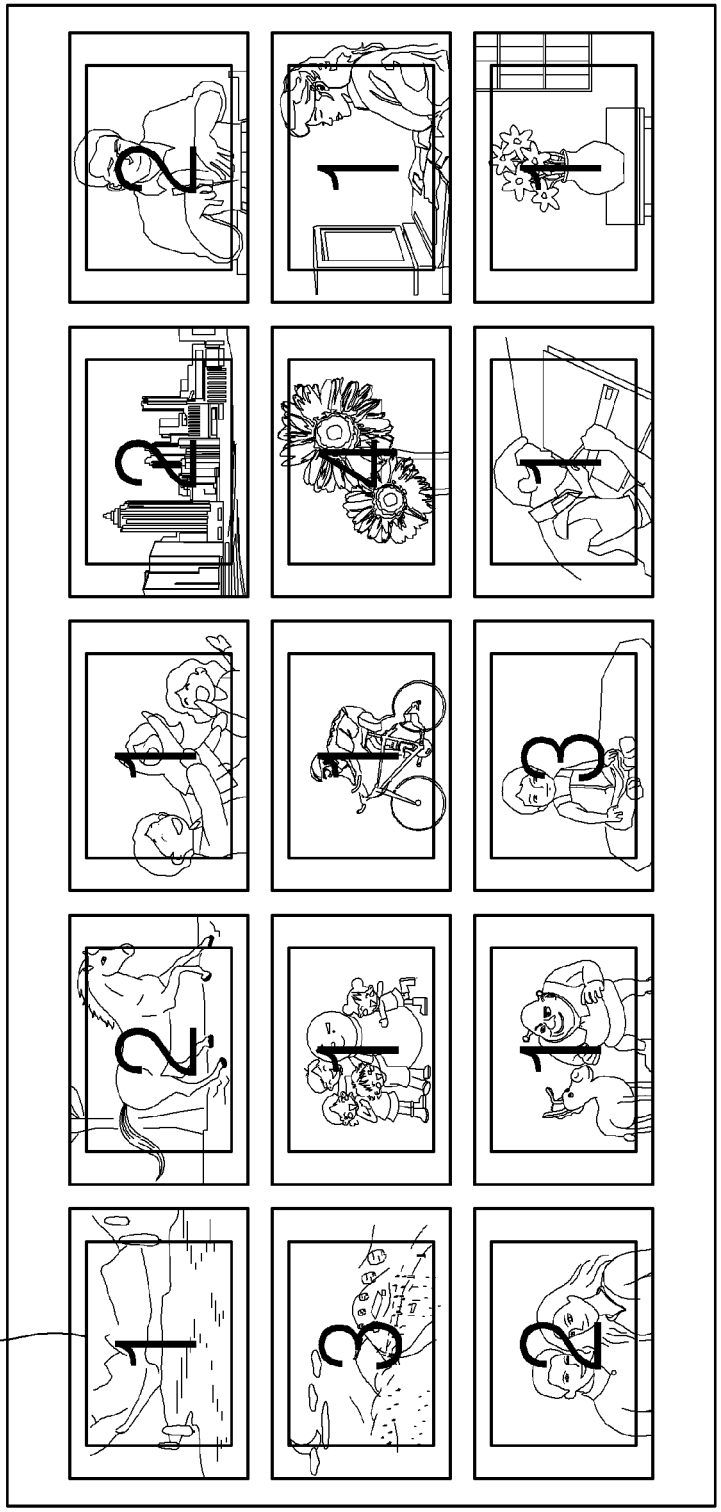
FIG. 5 illustrates input windows through which album names are input along with displayed pictures, according to another embodiment.

FIG. 5 illustrates input windows through which album names are input along with displayed pictures, according to another embodiment. Referring to FIG. 5, differently from the input window 410 of FIG. 4, a plurality of pictures, i.e., several thumbnail pictures, are displayed on a screen. Input windows 510 for inputting album names of the pictures overlap with the pictures. Thus, if a user selects a picture to which the user desires to give an album name, an input window for inputting an album name of the corresponding picture is displayed. Therefore, the user classifies album names into "1," "2," "3," and the like with respect to the plurality of pictures.

Figure 6:
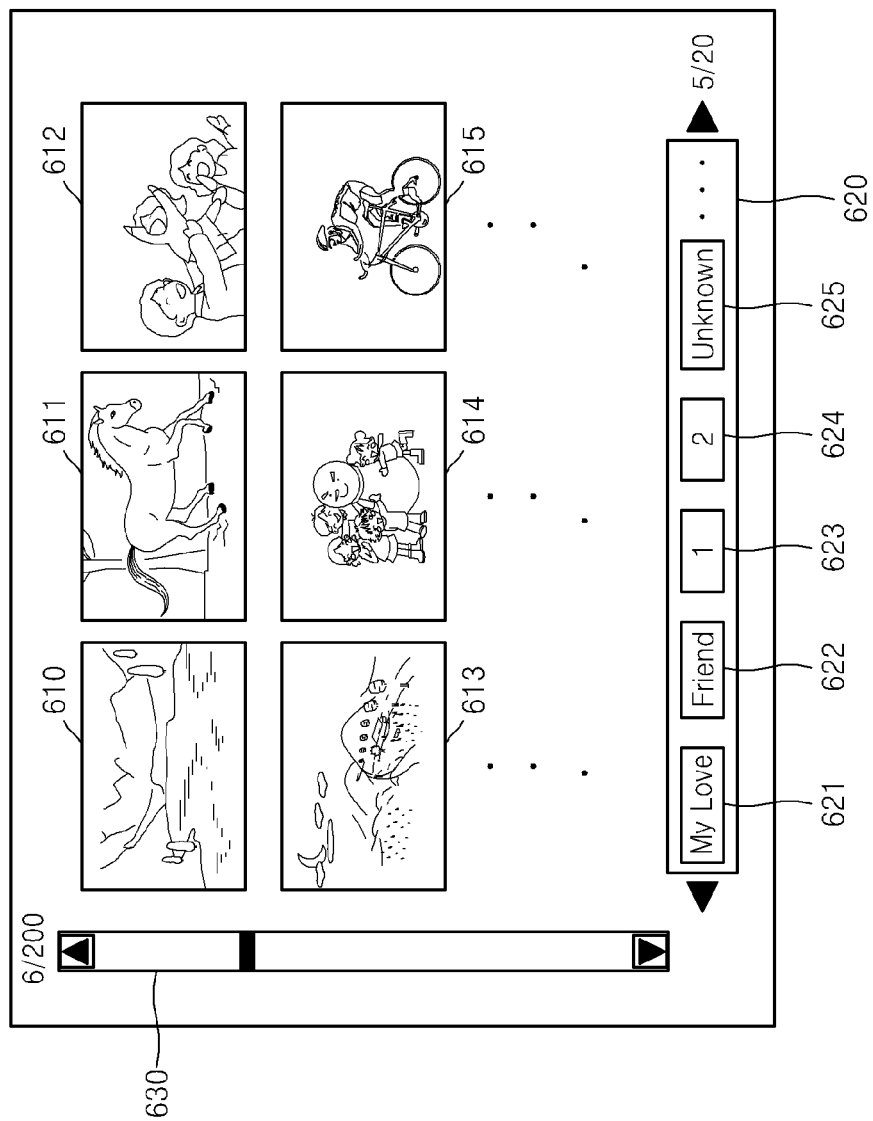
FIG. 6 illustrates folders that represent album names along with displayed pictures, according to another embodiment.

FIG. 6 illustrates folders that represent album names along with displayed pictures, according to another embodiment. In the descriptions described with reference to FIGS. 4 and 5, an input window for inputting an album name is popped up. However, in the present embodiment that will be described with reference to FIG. 6, album names or folders 621 through 625 that have been set using the above-described method are displayed on a bar 620 positioned at a bottom of a screen. Also, 5 of 20 folders are displayed on the current screen. The bar 620 may be scrolled to the left and right by a manipulation of a user. A bar 630 positioned on a left side of the screen displays 6 of 200 pictures (pictures 610, 611, 612, 613, 614, and 615) on the screen. The bar 630 may be scrolled up and down by a manipulation of the user The user seeing the displayed pictures 610 through 615 intuitively drags and drops any one or more of the displayed pictures 610 through 615 into folder names in the bar 620. For example, the user drags and drops the picture 615 into folder "Friend" 622 or the picture 612 into folder "My Love" 621. The user inputs corresponding pictures into album names which have been stored by the user, through an input window as described with reference to FIGS. 4 and 5. Therefore, the user intuitively and easily classifies a large number of stored pictures into albums.

In a method and an apparatus for managing an album according to various embodiments, if a user inputs a desired album title, texts of the album title can be recognized and arranged. A folder corresponding to an album name can be automatically generated. As a result, convenience of the user can be improved.

The above-described embodiments have described a digital camera as an example of a digital photographing apparatus, but this should not be construed as limiting. It will be understood by those of ordinary skill in the art that embodiments of the digital photographing apparatus may be applied to a camera phone having a camera function, a personal digital assistant (PDA), or a portable multimedia player (PMP).

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable media such as read-only memory (ROM), random-access memory (RAM), CD-ROMs, magnetic tapes, floppy disks, and optical data storage devices. The computer readable recording media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains can easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. The words "mechanism" and "element" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". It will be recognized that the terms "comprising," "including," and "having," as used herein, are specifically intended to be read as open-ended terms of art.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention.

What is claimed is:

1. A method for managing an album in a portable digital photographing apparatus, comprising:
    displaying one or more pictures on a display screen of the portable digital photographing apparatus;
    displaying an input window for inputting album names of the one or more pictures on the display screen of the portable digital photographing apparatus;
    recognizing texts which are input through the input window; and
    sorting the one or more pictures according to the recognized texts;
    wherein the input window is displayed to overlap with the displayed one or more pictures, the input window having a background that is at least partially transparent to show portions of the one or more pictures that are overlapped by the input window.

2. The method of claim 1, further comprising generating two or more folders that correspond to the recognized texts and comprise the sorted pictures and displaying the two or more folders along with the displayed one or more pictures.

3. The method of claim 2, wherein the two or more folders are displayed on a bottom of the display screen.

4. The method of claim 2, wherein the displayed one or more pictures are dragged and dropped into the two or more folders.

5. The method of claim 1, further comprising:
    storing stored values corresponding to the recognized texts in an EXchangeable Image File (EXIF) of corresponding pictures, and
    generating albums according to the stored values.

6. The method of claim 1, wherein the input window is displayed on a bottom of the displayed one or more pictures.

7. The method of claim 1, wherein the one or more pictures are displayed as thumbnail images.

8. The method of claim 7, wherein the input window is displayed in a center of the displayed thumbnail images.

9. A non-transitory computer-readable storage medium having stored thereon a computer program executable by a processor for performing a method for managing an album in a portable digital photographing apparatus, the method comprising:

displaying one or more pictures on a display screen of the portable digital photographing apparatus;

displaying an input window for inputting album names of the one or more pictures on the display screen of the portable digital photographing apparatus;

recognizing texts which are input through the input window; and sorting the one or more pictures according to the recognized texts;

wherein the input window is displayed to overlap with the displayed one or more pictures, the input window having a background that is at least partially transparent to show portions of the one or more pictures that are overlapped by the input window.

10. An apparatus for managing an album in a portable digital photographing apparatus, comprising:

a display which displays one or more pictures on a display screen of the portable digital photographing apparatus;

a controller which controls the display to display an input window for inputting album names of the one or more pictures on the display screen of the portable digital photographing apparatus;

a text recognizer which recognizes texts input through the input window; and an album manager which sorts and stores pictures according to the recognized texts, wherein the controller controls the display to display the input window so that the input window overlaps with the displayed one or more pictures, the input window having a background that is at least partially transparent to show portions of the one or more pictures that are overlapped by the input window.

11. The apparatus of claim 10, wherein the controller generates two or more folders which correspond to the recognized texts and which comprise the sorted pictures, and wherein the controller stores the two or more folders in the album manager wherein the controller controls the display to display the two or more folders along with the displayed one or more pictures.

12. The apparatus of claim 11, wherein the controller controls the display to display the two or more folders on a bottom of the display screen.

13. The apparatus of claim 12, wherein the controller drags and drops the displayed one or more pictures into the two or more folders.

14. The apparatus of claim 10, wherein the controller stores stored values corresponding to the recognized texts in an EXIF of corresponding pictures and generates albums according to the stored values.

15. The apparatus of claim 10, wherein the controller controls the display to display the input window on a bottom of the displayed one or more pictures.

16. The apparatus of claim 10, wherein the controller controls the display to display the one or more pictures as thumbnail images.

17. The method of claim 1, further comprising:

generating two or more folders that correspond to the recognized texts and comprise the sorted pictures, displaying the generated two or more folders;

displaying unsorted one or more pictures; and including one of the unsorted one or more pictures to one folder of the displayed two or more folders.

\* \* \* \* \*